United States Patent
Wu et al.

(10) Patent No.: US 12,252,566 B2
(45) Date of Patent: *Mar. 18, 2025

(54) FLUORINE-CONTAINING MIXTURE MATERIAL AND FLUORINE-CONTAINING SUPER-OLEOPHOBIC MICROPOROUS MEMBRANE USING SAME AS RAW MATERIAL, AND PREPARATION METHOD THEREFOR AND USE THEREOF

(71) Applicant: Zhejiang Hyproof Technology Co., Ltd, Zhejiang (CN)

(72) Inventors: Huisheng Wu, Zhejiang (CN); Ying Yang, Zhejiang (CN)

(73) Assignee: ZHEJIANG HYPROOF TECHNOLOGY CO., LTD., Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,020

(22) Filed: Jun. 2, 2023

(65) Prior Publication Data
US 2023/0303742 A1 Sep. 28, 2023

Related U.S. Application Data

(63) Continuation of application No. 16/624,939, filed as application No. PCT/CN2018/081857 on Apr. 4, 2018, now Pat. No. 11,702,494.

(30) Foreign Application Priority Data

| Jun. 20, 2017 | (CN) | ......................... | 201710470817.9 |
| Jun. 20, 2017 | (CN) | ......................... | 201710471959.7 |
| Jun. 20, 2017 | (CN) | ......................... | 201710471962.9 |

(51) Int. Cl.
*C08F 2/46* (2006.01)
*B29C 48/00* (2019.01)
(Continued)

(52) U.S. Cl.
CPC .... *C08F 220/1811* (2020.02); *B29C 48/0018* (2019.02); *B29C 48/0019* (2019.02);
(Continued)

(58) Field of Classification Search
CPC ...... C08L 51/00; C08L 27/18; C08L 2203/16; A41D 31/00; A41D 31/02; C08G 18/758; C08G 18/12; C08G 18/672; C08G 18/6755; C08G 18/4825; C08G 18/48; C08J 5/18; C08J 2327/18; C08J 2475/14; C08J 2433/16; C08J 2433/04; C08F 214/262; C08F 220/1811; C08F 291/12; C08F 291/04; C08F 259/08; B32B 5/026; B32B 5/022; B32B 5/245; B32B 5/18; B32B 37/182; B32B 37/12; B32B 7/14; B32B 2437/00; B32B 2327/18; B29C 48/022; B29C 48/92; B29C 48/06; B29C 48/0011; B29C 48/0019; B29C 48/0021; B29C 48/0018; B29C 2948/92704; B29K 3206/41; B29K 3206/0088; B29K 2027/18; B29K 2033/08; B29K 2509/02;
(Continued)

(56) References Cited

U.S. PATENT DOCUMENTS

| 5,164,426 A | * | 11/1992 | Shimizu | ................. | C08F 259/08 |
| | | | | | 525/902 |
| 6,884,847 B2 | | 4/2005 | Irie et al. | | |
| 11,702,494 B2 | * | 7/2023 | Wu | ....................... | C08F 291/12 |
| | | | | | 156/60 |

FOREIGN PATENT DOCUMENTS

| CN | 1373792 A | | 10/2002 |
| CN | 102020751 | * | 4/2011 |

(Continued)

OTHER PUBLICATIONS

Wu et al., CN 102020751 Machine Translation, Apr. 20, 2011 (Year: 2011).*
Koike et al., CN103249562 Machine Translation, Jul. 8, 2015 (Year: 2015).*

(Continued)

*Primary Examiner* — Jessica Whiteley
(74) *Attorney, Agent, or Firm* — Morgan, Lewis & Bockius LLP

(57) ABSTRACT

This disclosure provides a fluorine-containing mixture and a fluorine-containing super-oleophobic microporous membrane using the fluorine-containing mixture as a raw material, as well as preparation methods and applications for the fluorine-containing mixture and the fluorine-containing super-oleophobic microporous membrane. The fluorine-containing mixture of the present disclosure comprises, by weight percentage, the following components: Component A: 50%~90%; Component B: 3%~25%; Component C: 0%~35%; Component D: 0%~3%; wherein Component A comprises high molecular weight polytetrafluoroethylene homopolymer or copolymer dispersion resin; Component B comprises one or more fluorine-containing alkyl acrylate monomers; Component C comprises one or more fluorine-free acrylates; Component D comprises high temperature free radical initiator. There's no need to add inflammable or explosive lubricating oil, making the process highly safe; and the obtained fluorine-containing super-oleophobic microporous membrane has high waterproof, air-permeable, oil-resistant and washable performance, in line with the needs of a new generation of waterproof and air-permeable protective clothing.

20 Claims, No Drawings

(51) Int. Cl.
| | |
|---|---|
| B29C 48/06 | (2019.01) |
| B32B 5/02 | (2006.01) |
| B32B 7/14 | (2006.01) |
| B32B 27/12 | (2006.01) |
| B32B 27/20 | (2006.01) |
| B32B 27/30 | (2006.01) |
| B32B 37/12 | (2006.01) |
| B32B 37/18 | (2006.01) |
| C08F 2/50 | (2006.01) |
| C08F 214/26 | (2006.01) |
| C08F 220/18 | (2006.01) |
| C08G 18/12 | (2006.01) |
| C08G 18/48 | (2006.01) |
| C08G 18/67 | (2006.01) |
| C08G 18/75 | (2006.01) |
| C08G 61/04 | (2006.01) |
| C08J 5/18 | (2006.01) |
| C08L 27/18 | (2006.01) |
| B29K 27/18 | (2006.01) |
| B29K 33/00 | (2006.01) |
| B29K 105/00 | (2006.01) |
| B29K 105/04 | (2006.01) |
| B29K 507/04 | (2006.01) |
| B29K 509/02 | (2006.01) |
| B29L 31/00 | (2006.01) |
| B29L 31/48 | (2006.01) |

(52) U.S. Cl.
CPC ........ *B29C 48/0021* (2019.02); *B29C 48/022* (2019.02); *B29C 48/06* (2019.02); *B32B 5/024* (2013.01); *B32B 7/14* (2013.01); *B32B 27/12* (2013.01); *B32B 27/20* (2013.01); *B32B 27/304* (2013.01); *B32B 27/308* (2013.01); *B32B 37/12* (2013.01); *B32B 37/182* (2013.01); *C08F 214/262* (2013.01); *C08G 18/12* (2013.01); *C08G 18/4825* (2013.01); *C08G 18/6755* (2013.01); *C08G 18/758* (2013.01); *C08J 5/18* (2013.01); *C08L 27/18* (2013.01); *B29K 2027/18* (2013.01); *B29K 2033/08* (2013.01); *B29K 2105/0088* (2013.01); *B29K 2105/041* (2013.01); *B29K 2507/04* (2013.01); *B29K 2509/02* (2013.01); *B29K 2995/0065* (2013.01); *B29K 2995/0069* (2013.01); *B29L 2031/4842* (2013.01); *B29L 2031/755* (2013.01); *B32B 2262/0261* (2013.01); *B32B 2270/00* (2013.01); *B32B 2305/026* (2013.01); *B32B 2305/188* (2013.01); *B32B 2307/724* (2013.01); *B32B 2307/7265* (2013.01); *B32B 2327/18* (2013.01); *B32B 2333/08* (2013.01); *B32B 2377/00* (2013.01); *B32B 2437/00* (2013.01); *C08J 2327/18* (2013.01); *C08J 2475/14* (2013.01); *C08L 2203/16* (2013.01)

(58) Field of Classification Search
CPC ........ B29K 2995/065; B29K 2995/069; B29K 2507/04; B29L 2031/4842; B29L 2031/755; Y02E 60/10
USPC ..... 156/60, 1; 522/6, 189, 184, 71, 1; 520/1
See application file for complete search history.

(56) References Cited

FOREIGN PATENT DOCUMENTS

| CN | 102020751 | A | * | 4/2011 | | |
|---|---|---|---|---|---|---|
| CN | 102294181 | A | | 12/2011 | | |
| CN | 103158310 | A | | 6/2013 | | |
| CN | 103555119 | A | | 2/2014 | | |
| CN | 104437126 | A | | 3/2015 | | |
| CN | 103249562 | | * | 7/2015 | | |
| CN | 103249562 | B | * | 7/2015 | ............. | B29C 59/02 |
| CN | 104760381 | A | | 7/2015 | | |
| CN | 105251370 | A | | 1/2016 | | |
| CN | 107216431 | A | | 9/2017 | | |
| CN | 107325238 | A | | 11/2017 | | |
| CN | 107353374 | A | | 11/2017 | | |

OTHER PUBLICATIONS

International Search Report issued in corresponding International Patent Application No. PCT/CN2018/081857, dated Jul. 9, 2018.

* cited by examiner

FLUORINE-CONTAINING MIXTURE MATERIAL AND FLUORINE-CONTAINING SUPER-OLEOPHOBIC MICROPOROUS MEMBRANE USING SAME AS RAW MATERIAL, AND PREPARATION METHOD THEREFOR AND USE THEREOF

CROSS REFERENCE

The present application is a continuation application of U.S. patent application Ser. No. 16/624,939 filed on Dec. 20, 2019, which is a U.S. national stage application of the PCT International Application No. PCT/CN2018/081857 filed on Apr. 4, 2018, which claims the benefit of foreign priority to Chinese patent applications Nos. 201710471959.7, 201710470817.9, and 201710471962.9 filed on Jun. 20, 2017. The entire contents of all the documents mentioned above are incorporated herein by reference.

TECHNICAL FIELD

This disclosure relates to the technical field of special fluorine-containing super-oleophobic microporous membranes used in windproof, snow-proof, rainproof, light, warm and air-permeable protective clothing fabrics, specifically a fluorine-containing mixture and a fluorine-containing super-oleophobic microporous membrane using the same as a raw material, and the preparation method thereof and application thereof.

BACKGROUND

Fluorinated polymers, especially homopolymerized, modified or copolymerized resins of tetrafluoroethylene, have excellent physical mechanical properties and chemical stability, and are widely used in chemical materials, mechanical electronics, aerospace, military protection, new materials and new energy sources. Industrially, high purity (>99.99%) tetrafluoroethylene monomer is usually used to prepare a dispersion resin through polymerization or copolymerization by a dispersion polymerization method. After mixing the high molecular weight polytetrafluoroethylene dispersion resin with the lubricating oil, the paste is pressed, extruded, deoiled, and then subjected to uniaxial or biaxial stretching, and finally sintered to obtain the expanded polytetrafluoroethylene microporous gas permeable membrane material. Due to its special properties, the material becomes a high-end functional fluorine-containing microporous polymer material used, for example, for environmental protection filtration, protective clothing fabrics, medical equipment, electronic materials and sealing insulation materials. However, such a microporous membrane is easily contaminated by oil and loses its water repellency. In addition, the lubricating oil used is flammable and explosive during deoiling and is likely to cause industrial safety hazards. In the 1980s, W. L. Gore & Associates, Inc. disclosed the invention of coating a hydrophilic polyurethane on one side of an expanded polytetrafluoroethylene membrane to improve the oil resistance of one side, but the air permeability of the membrane was sacrificed. In the 1990s, W. L. Gore & Associates, Inc. disclosed the invention of coating fluorinated acrylic emulsion on an expanded polytetrafluoroethylene membrane to increase its oil resistance without sacrificing air permeability. However, such a product manufacturing process is too complicated, and the waterproofness and air permeability of the resultant product still need to be further improved, especially when it is applied to aerospace and marine technology; its performance still has room for improvement CN1373792A (Publication Date: 2002 Oct. 9) discloses a transparent elastomer composition obtained by co-coagulation of a fluororesin microparticle emulsion having an average particle diameter of 20 to 150 nm and an elastomer particle emulsion, wherein the fluororesin microparticles are uniformly and finely dispersed in the elastomer, since the fluororesin fine particles are uniformly finely dispersed in the elastomer in advance, it is possible to provide an elastomer molded article excellent in mechanical strength, abrasion resistance, and transparency, but the composition of such an elastomer is too small in molecular weight due to the particle size of the fluororesin, and cannot be expanded to form a fluorine-containing microporous film. To obtain an expanded fluorine-containing microporous material with high strength, the molecular weight of polytetrafluoroethylene must be high enough. The standard specific gravity of the resin must be between 2.14 and 2.17, and the average particle size must be between 180 and 360 nm.

CN104437126A (Publication Date: 2015 Mar. 25) discloses a method for preparing a superhydrophobic polytetrafluoroethylene microporous membrane, a membrane obtained by the method, and use thereof. CN102294181A (Publication Date: 2011 Dec. 28) discloses a double-repellent tetrafluoroethylene microporous membrane. The two technical solutions are similar; both disclose using polytetrafluoroethylene, superhydrophobic polymer (Number-average Molecular Weight 5000-250000) such as fluorine-containing alkyl acrylate, and flammable and explosive lubricating oil mixture to obtain the membrane. The obtained membrane has low tensile strength (<20 MPa), and low oil resistance (only resistant to oil repellency grade 3 oil). The fouling resistance and washing resistance of the fabric laminated with such a membrane is poor.

CN103158310A (Publication Date: 2013 Jun. 19) discloses a highly-oil-repellent highly-waterproof seamless polytetrafluoroethylene expanded sheet material and the preparation method thereof, which is made of polytetrafluoroethylene and flammable and explosive lubricating oil, and then coated with polyurethane resin coating. The obtained film has no air permeability, no oleophobicity (only resistant to grade 1 oil). The fabric laminated with such a film has poor moisture permeability and is not comfortable to wear.

CN104760381A (Publication Date: 2015 Jul. 8) discloses a preparation method for enhancing moisture permeability of a polytetrafluoroethylene waterproof and moisture permeable fabric, which is formed by using polytetrafluoroethylene and flammable and explosive lubricating oil, and then coated with microporous polyurethane coating. The resulting membrane is not highly permeable, has no oleophobicity (only resistant to grade 1 oil), has poor flame retardancy, and is not suitable for high-end applications. Fluorinated polymers, especially homopolymerized, modified or copolymerized resins of tetrafluoroethylene, have excellent physical mechanical properties and chemical stability, and are widely used in chemical materials, mechanical electronics, aerospace, military protection, new materials and new energy sources. The homopolymerized, modified, or copolymerized polymer resins of chlorine-containing polymers, such as chlorotrifluoroethylene, have excellent physical and mechanical properties and chemical penetration resistance, making an important contribution to chemical protection. Fluorine-containing conductive polymers such as DuPont's Nafion resin have excellent electrical conductivity and chemical stability. They are widely used in fuel cells and chlor-alkali batteries, but there are still many shortcomings, such as low conductivity—the room temperature conductivity of a single film<0.1 (S/cm)—and high chemical penetration—ineffective at blocking the penetration of toxic and hazardous chemicals.

SUMMARY OF THE DISCLOSURE

Problems to be Solved by this Disclosure

In view of the deficiencies of the prior art, the present disclosure aims to provide a fluorine-containing mixture—using the fluorine-containing mixture as a raw material, a fluorine-containing super-oleophobic microporous membrane with higher waterproof, air-permeable, oil-resistant, water-washing resistance performances, which is compatible with the demands for a new generation of waterproof air-permeable protective clothing, can be obtained. The present disclosure also provides a preparation method of the fluorine-containing super-oleophobic microporous membrane, which does not need to add a flammable and explosive lubricating oil, making the method highly safe.

Solution for the Problems

The present disclosure provides a fluorine-containing mixture for a fluorine-containing super-oleophobic microporous membrane, comprising the following compositions in weight percentage: Component A: 50%~90%; Component B: 3%~25%; Component C: 0%~35%; and Component D: 0%~3%; wherein Component A comprises high molecular weight polytetrafluoroethylene homopolymer or copolymer dispersion resin; Component B comprises one or more fluorine-containing alkyl acrylate monomers; Component C comprises one or more fluorine-free acrylates; Component D comprises high temperature free radical initiator.

A fluorine-containing mixture for a fluorine-containing super-oleophobic microporous membrane according to the present disclosure, wherein the mixture is obtained after adding Component A, Component B, Component C, and Component D in sequence and mixed through non-shear mixing.

A fluorine-containing mixture for a fluorine-containing super-oleophobic microporous membrane according to the present disclosure, wherein the standard specific gravity of the described Component A is 2.13 to 2.18.

A fluorine-containing mixture for a fluorine-containing super-oleophobic microporous membrane according to the present disclosure, wherein the described Component B has a molecular weight of <3000 and a melting point of 80° C. or less.

A fluorine-containing mixture for a fluorine-containing super-oleophobic microporous membrane according to the present disclosure, wherein the described Component C has a molecular weight of <8000 and a melting point of 80° C. or less.

A fluorine-containing mixture for a fluorine-containing super-oleophobic microporous membrane according to the present disclosure, wherein the described Component B comprises one or several kinds of perfluorobutyl ethyl acrylate, perfluorobutyl ethyl methacrylate, perfluorohexyl ethyl acrylate, perfluorohexyl ethyl methacrylate, perfluorooctylethyl acrylate, perfluorooctylethyl methacrylate, n-methyl perfluorobutyl sulfonate ethyl methacrylate, n-methyl perfluorohexyl sulfonate ethyl acrylate, n-methyl perfluorohexyl sulfonate ethyl methacrylate, n-methyl perfluorooctyl sulfonate ethyl acrylate and n-methyl perfluorooctyl sulfonate ethyl methacrylate.

A fluorine-containing mixture for a fluorine-containing super-oleophobic microporous membrane according to the present disclosure, wherein the described high radical initiator include one or several kinds of dicumyl peroxide (CAS: 80-43-3), 2,5-dimethyl-2,5-di-(tert-butylperoxy) hexane (CAS: 78-63-7), di-tert-butyl peroxide (CAS: 110-05-4), 2,5-di(tert-butylperoxy)-2,5-dimethyl-3-hexyne (CAS: 1068-27-5), and cumene hydroperoxide (CAS: 80-15-9).

A fluorine-containing mixture for a fluorine-containing super-oleophobic microporous membrane according to the present disclosure, wherein the described Component C comprises fluorine-free alkyl acrylate or a mixture of fluorine-free alkyl acrylate and polyurethane acrylate prepolymers.

The present disclosure also provides a fluorine-containing super-oleophobic microporous membrane, primarily made from the fluorine-containing mixture described by the present disclosure.

The fluorine-containing super-oleophobic microporous membrane according to the present disclosure can also contain one or more kinds of additives including active carbon powder, graphite, and inorganic compounds wherein the weight ratio of the fluorine-containing mixture to the additives is 1:0.1~1.0.

A fluorine-containing super-oleophobic microporous membrane according to the present disclosure, wherein the described inorganic compound is titanium dioxide or silicon dioxide.

The present disclosure also provides a preparation method for the fluorine-containing super-oleophobic microporous membrane, comprising the following steps: S1: The fluorine-containing mixture is uniformly stirred in a non-shearing manner, without adding lubricating oil, directly poured into the press extrusion cylinder barrel, and after exhausting, the paste is pressed at 20° C. to 100° C. to form a cylindrical paste mixture rod. Optionally, one or more of additives including active carbon powder, graphite, or inorganic compounds may be added into the fluorine mixture; the weight ratio of the fluorine-containing mixture to the additives is 1:0.1~1.0. S2: extrude the described cylindrical paste mixture rod with extruder at 20° C. to 100° C. and press into strip; S3: stretch the described strip uniaxially or biaxially at 100° C. to 200° C., and, finally, heat set at 200° C. to 390° C. to obtain the fluorine-containing super-oleophobic microporous membrane.

A preparation method for fluorine-containing super-oleophobic microporous membrane according to the present disclosure, wherein the described inorganic compound is titanium dioxide or silicon dioxide.

A preparation method for fluorine-containing super-oleophobic microporous membrane according to the present disclosure, wherein when one or more of additives including active carbon powder, graphite, inorganic compounds are added into fluorine-containing mixture in S1, viscosity regulators are also added; the optimal viscosity regulators are isodecyl acrylate and isotridecyl acrylate.

The present disclosure also provides the application of the fluorine-containing super-oleophobic microporous membrane according to the present disclosure on multi-layer fabrics.

Effects of the Disclosure

Using the fluorine-containing mixture of the present disclosure as a raw material, there is no need to add explosive or flammable lubricants in the manufacturing process of the fluorine-containing super-oleophobic microporous membrane, thereby avoiding the risk of deflagration or explosion; the obtained fluorine containing microporous membrane has higher waterproof, air permeable, oil resistant and laundry resistant performances, meeting the requirements for a new generation of waterproof air-permeable protective clothing. The oil repellency grade is at least 5.

DETAILED DESCRIPTIONS

The present disclosure will be further described below. It should be noted that the present embodiment provides a detailed implementation manner and a specific operation procedure on the premise of the present technical solution, but the scope of protection of the present disclosure is not limited to the embodiment.

The reaction pressure of the present disclosure is in kilograms, strictly speaking "kilogram force per square centimeter", and 1 kilogram pressure=1 kg/cm$^2$.

In the present disclosure, the term "molecular weight" is an index average molecular weight (Mn), and Mn is defined as a number average molecular weight determined by light scattering (optionally combined with size exclusion chromatography SEC).

<Fluorine-Containing Mixture>

The present disclosure provides a fluorine-containing mixture for a fluorine-containing super-oleophobic microporous membrane comprising, by weight percentage, the following components: 50% to 90% Component A; 3% to 25% Component B; 0% to 35% Component C; and 0% to 3% Component D; the sum of the weight percentages of each component is 100%.

Preferably, the Component A is 60% to 80%; the Component B is 8% to 20%; the Component C is 0% to 25%; and the Component D is 0.5% to 1.5%; the percentages should add up to 100%. Wherein, Component A comprises high molecular weight polytetrafluoroethylene homopolymer or copolymer dispersion resin; Component B comprises one or more fluorine-containing alkyl acrylate monomers; Component C comprises one or more fluorine-free acrylates; Component D comprises high temperature free radical initiator.

Further, Component A, Component B, Component C and Component D are added in sequence and then mixed through non-shear mixing; "Adding in sequence" refers to adding the components in order into the mixture.

The number average molecular weight of the high molecular weight polytetrafluoroethylene homopolymer or copolymer dispersion resin of Component A ranges from 5,000 to 250,000; the manufacturing method thereof is described in many documents and is not limiting. One specific embodiment of the present disclosure uses the following preparation method: deionized water and perfluorosurfactant are added to the high-pressure reactor; the high-pressure reactor is vacuumed and discharged, then heating and stirring begins; when the temperature in the high-pressure reactor rises to about 50-80° C., Tetrafluoroethylene with a purity of >99.999% and a comonomer copolymerizable with tetrafluoroethylene is introduced into the high-pressure reactor; once the pressure in the high-pressure reactor reaches 11 to 29 kg, a radical initiator is added to start the polymerization reaction, with the temperature in the high-pressure reactor maintained at 70-110° C.; continue the reaction until the solid content of the emulsion reaches 20 to 39%; after the temperature in the high-pressure reactor is lowered to less than 50° C., stop the stirring. discharge the unreacted monomer and discharge the reactant. The obtained high molecular weight polytetrafluoroethylene homopolymerized or copolymerized dispersion resin emulsion has a primary particle having an average particle diameter of about 180 to 390 nm. The preferred primary particle has an average particle diameter of about 220 to 330 nm. Wherein pure 99.999% of tetrafluoroethylene accounts for 95% to 99.99% by volume of the total monomer in the reactor. The comonomer copolymerizable with tetrafluoroethylene is selected from any monomer or a combination of more than one monomer from perfluoromethyl vinyl ether, perfluoroethyl vinyl ether, perfluoropropyl vinyl ether, vinylidene fluoride, vinyl fluoride, 3,3,3-trifluoropropene, perfluoroalkylethylene or the like (C2-C8 alkyl group). Preferably, the high molecular weight polytetrafluoroethylene homopolymer or copolymer dispersion resin is an ultrahigh molecular weight polytetrafluoroethylene homopolymer or copolymer dispersion resin having a standard specific gravity of between 2.13 and 2.18—preferably between 2.135 and —. 2.165—and a melting point between 325° C. — 350° C. The described perfluorosurfactant is an organic compound having 6 to 16 carbons and containing at least one functional group of a carboxylic acid or a sulfonic acid. Preferably, the surfactant is a perfluorosurfactant; industrially, ammonium perfluorooctanoate, perfluorooctanoate and the like are examples. In a nonlimiting embodiment of the present disclosure, the perfluorosurfactant is ammonium perfluorooctanoate. The described free radical initiator is selected from any one or a combination of persulfate, hydrogen peroxide or organic peroxide Examples of the described persulfate include ammonium persulfate (APS) and potassium persulfate (KPS). Examples of the organic peroxide include peroxydisuccinic acid (DSP) and dipentane peroxide. in view of an appropriate decomposition temperature of the initiator, ease of handling, cost, and polymer terminal structure, APS is preferable. During the polymerization process, the pressure in the high-pressure reactor is maintained at least 15 kg or more. The high molecular weight polytetrafluoroethylene homopolymerization or copolymerization dispersion resin is obtained by agglomerating and drying the high pressure polymerized high molecular weight polytetrafluoroethylene homopolymerized or copolymerized dispersion resin emulsion.

Furthermore, the described Component B has a molecular weight of <3000 and a melting point of 80° C. or less. Preferably, the Component B comprises, but is not limited to, one or more kinds of perfluorobutyl ethyl acrylate (CH2=CHCOOC2H4C4F9), perfluorobutyl ethyl methacrylate (CH2=C(CH3)COO C2H4C4F9), perfluorohexylethyl acrylate (CH2=CHCOOC2H4C6F13), perfluorohexylethyl methacrylate (CH2=C(CH3) COO C2H4 C6F13), perfluorooctylethyl acrylate (CH2=CHCOOC2H4 C8F17), perfluorooctylethyl methacrylate (CH2=C(CH3) COOC2H4C8F17), N-methyl, perfluorobutyl sulfonate aminoethyl acrylate (CH2=CHCOOC2H4NCH3S02C4F9), N-methyl, perfluorobutyl sulfonate aminoethyl methacrylate (CH2=C(CH3) COOC2H4NCH3S02C4F9), N-methyl, perfluorohexyl sulfonate aminoethyl acrylate (CH2=CHCOOC2H4NCH3S02C6F13), N-methyl, perfluorohexyl sulfonate aminoethyl methacrylate (CH2=C(CH3) COOC2H4NCH3S02C6F13), N-methyl, perfluorooctane sulfonate aminoethyl acrylate (CH2=CHCOOC2H4NCH3S02C8F17), N-methyl, perfluorooctane sulfonate aminoethyl methacrylate (CH2=C(CH3) COOC2H4NCH3S02C8F17).

In the present disclosure, the Component C is a fluorine-free alkyl acrylate or a mixture of a urethane acrylate prepolymer and a fluorine-free alkyl acrylate, having a molecular weight of <8000—with a preferred molecular weight of <5000—and a melting point of 80° C. or less—with a preferred melting point below 50° C.

The described urethane acrylate prepolymer can be obtained by the following preparation method: vacuum the high-pressure reactor to remove moisture, then add diisocyanate and start heating and stirring; the temperature in the high-pressure reactor is raised to about 50 to 150° C., and then a polyol (including polyether polyol or polyester polyol) is introduced into the high-pressure reactor. The total equivalent molar ratio of the two main raw materials is diisocyanate (—NCO isocyanate equivalent): polyol (—OH hydroxyl equivalent)=2:1 to 8:1. The reaction temperature in the high-pressure reactor should be maintained at about 50-150° C. After about 10 to 180 minutes of reaction, add hydroxyalkyl group-containing acrylate or hydroxyalkyl group-containing methacrylate to the high-pressure reactor; the number of equivalents of the added hydroxyalkyl acrylate is greater than or equal to the number of unreacted isocyanate equivalents (the ratio of hydroxyl to isocyanate equivalents is about 2:1 to 1:1). Completely react the remaining unreacted isocyanate with a hydroxyalkyl group to form a urethane acrylate prepolymer. After stirring and mixing, the reaction temperature in the high-pressure reactor is maintained at about 50 to 150° C., the reaction is carried out for about 10 to 180 minutes, and then cooled down and discharged to obtain the urethane acrylate prepolymer.

In one nonlimiting embodiment of this disclosure, the composition of the Component C is from 0% to 70% by weight percent of the urethane acrylate prepolymer; and from 30% to 100% of the fluorine-free alkyl acrylate. The urethane acrylate prepolymer is hot melt, and its melting point is below 80° C., preferably below 50° C.; its raw material is selected from the following: aromatic diisocyanate, aliphatic diisocyanate, or binary to ternary isocyanate; and a polyol selected from the group consisting of polyethylene glycol, polypropylene glycol, polytetramethylene glycol, polyester polyol, and polycarbonate. The polyol has a molecular weight of 600 to 5000, preferably 1000 to 3000, with 2 to 3 hydroxyl groups per molecule. The fluorine-free alkyl acrylate has an average molecular weight of less than 1,000—preferably the average molecular weight of less than 600—a melting point of less than 80° C. —preferably the melting point is less than 50° C. —and an atmospheric boiling point of 160° C. or more, including any one or several kinds of Hydroxyalkyl acrylate, hydroxyalkyl methacrylate, C5 to C20 alkyl acrylate, C4 to C20 alkyl methacrylate, and C6 to C20 acid vinyl ester; wherein hydroxyalkyl acrylate and hydroxyalkyl methacrylate include hydroxyethyl acrylate, hydroxyethyl methacrylate, hydroxypropyl acrylate, and hydroxypropyl methacrylate. Furthermore, preferably, the fluorine-free alkyl acrylate is a radically polymerizable monomer or a mixed monomer thereof, and has a boiling point of 200° C. or more at normal pressure, including one or several kinds of isooctyl acrylate, isononyl acrylate, isodecyl acrylate, isoundecyl acrylate, isotridecyl acrylate, vinyl isooctanoate, vinyl neodecanoate, vinyl neodecanoate, other c6 to c18 containing alkyl acrylate, and other c6 to c18 alkyl methacrylate.

The Component D of the present disclosure comprises high temperature free radical initiator. The high-temperature free radical initiator is an organic free-radical initiator with a half-life of 100-250 degrees; half-life is defined as the given temperature where free-radical initiator retains at least half of the active ingredient to initiate free-radicals for 10 hours. The high temperature free radical initiator in the present disclosure includes one or more of dicumyl peroxide (CAS: 80-43-3), 2,5-dimethyl-2,5-di(tert-butylperoxy) hexane (CAS: 78-63-7), di-tert-butyl peroxide (CAS: 110-05-4), 2,5-Di(tert-butylperoxy)-2,5-dimethyl-3-hexyne (CAS: 1068-27-5) and cumene hydroperoxide (CAS: 80-15-9).

<Fluorine-Containing Super-Oleophobic Microporous Membrane>

The preparation method for the fluorine-containing super-oleophobic microporous membrane using the described fluorine-containing mixture is as follows:

S1 The described fluorine-containing mixture is uniformly stirred through non-shearing mixing—there's no need to add lubricating oil (avoiding the danger of flammability and explosion when deoiling)—and directly pour into the extrusion press cylinder barrel, after exhausting, the paste is pressed at 20° C.~100° C. to form a cylindrical paste mixture rod; S2: extrude the described cylindrical paste mixture rod with extruder at 20° C. to 100° C. and pressed into a strip. The strip thickness is between 50 and 2000 microns, preferably between 80 and 800 microns.

S3 The described strip is uniaxially or biaxially stretched at 100° C. to 200° C., and finally heat set at 200° C. to 390° C. to obtain a fluorine-containing super-oleophobic microporous membrane.

In step S1, an additive material including one or more of activated carbon powder, graphite, and inorganic materials may be optionally added to the fluorine-containing mixture, and the mixing ratio of the fluorine-containing mixture and the additive material is by weight ratio of 1:0.1 to 1.0. In this step, a small amount of other viscosity modifiers, such as isodecyl acrylate and isodecyl acrylate, may be added to avoid the problem that the viscosity of the activated carbon fine powder or graphite may be too high, and the mixing is uneven.

The fluorine-containing super-oleophobic microporous membrane prepared by the above method of the present disclosure has a thickness of about 0.005 to 1.5 mm, preferably about 0.01 to 0.08 mm; and a membrane weight of about 1 to 1200 g/m$^2$, preferably about 3 to 30 g/m$^2$. The porosity is about 30 to 95%; the initial oil resistance of the membrane surface is at least 5; the tensile strength of the membrane is >20 MPa; after 10 times of washing, the oil resistance of the membrane surface is at least grade 4. Optionally, the membrane permeability is tested by the Gurley method, the speed for 100 millimeters of air to pass through the material, to be less than 60 seconds.

The fluorine-containing microporous membrane can be laminated with a textile fabric; the fabric can be a woven fabric (20-180 g/m$^2$), a knitted fabric or a non-woven fabric; and the composite film is combined with the fabric by dot lamination adhesives. The water pressure resistance is initially greater than 100 kPa; after 10 times of water washing, the water pressure resistance is still greater than 60 kPa; the composite fabric permeability tested by Gurley method 100 ml air permeation is about 6 to 90 seconds; the sealing effect of the sealing strip at the sewing line is good, meeting application requirements. All other performance indicators are in line with the standard of waterproof and air-permeable clothing fabrics. The test standards are shown in Table 1.

TABLE 1

Test Standards for Waterproof and Air-permeable Clothing Fabric

| Protective Fluorine-containing Microporous Membrane: Test Method | Performance Requirements |
|---|---|
| Membrane and Fabric composite Fabric: Water Pressure Resistance (JISL1092) (Face toward the water) | Initial Water Pressure: Greater than 2 Kilograms. |
| [Wash with Standard Washing Machine (with detergent) + Tumble Dry] After 10 Cycles | Greater than 1 Kilogram (100 kpa) Water Pressure |
| [Deet: N,N-Diethyl-3-methylbenzamide (CAS 134-62-3) >95%] Spray on fabric and cover After 3 hours | Greater than 0.7 Kilogram (70 kPa) Water Pressure |
| [DEET] Spray on fabric and cover for one day, [Wash (with detergent) + tumble dry] After 3 cycles, test the water pressure | Greater than 0.7 Kilogram (70 kPa) Water Pressure |
| Wet Resistance [Wash continuously with standard washing machine for 50 cycles (without detergent) and finally tumble dry], test the water pressure | Greater than 0.7 Kilogram (70 kPa) Water Pressure |
| Low Temperature Resistance [At the temperature of minus 40 degrees Celsius, dry twist the fabric 10000 times.] | Greater than 0.7 Kilogram (70 kPa) Water Pressure |
| Composite Fabric Air Permeability [Gurley Densometer, the time required for 100 ml of air to pass through the sample] Face down (the shorter the time, the better the air permeability)] | Less than 30 seconds |
| Composite Fabric Water Vapor Permeability [JISL1099 A1] Face Up (the greater the better, easier to vent the perspiration) | Greater than 8000 g/m²/day |
| Composite Fabric Water Vapor Permeability [JISL1099 B2] Face up (the greater the better, easier to vent the perspiration) | Greater than 12000 g/m²/day |

In summary, when the fluorine-containing mixture material of the present disclosure is used as a raw material for preparing a fluorine-containing super-oleophobic microporous membrane, it is not necessary to add a flammable and explosive lubricating oil; the process is high in safety; and the additives added to the tetrafluoroethylene homopolymer or copolymerized dispersion resin can radical polymerize at a high temperature to form a part of the polymer microporous membrane; there is no industrial safety problem caused by the three wastes (solid, liquid, gas wastes). The obtained fluorine-containing super-oleophobic microporous membrane has evident improvement in waterproof, oil-resistance and anti-fouling performance, and can meet the important requirements of resisting high water pressure and preventing toxic and harmful liquid from invading the human body, and has higher ventilation and moisture permeability, and good sewn seams sealing effects for the application requirements. When applied to protective composite fabrics, it is light, comfortable, air-permeable, waterproof and has high protective performance against toxic and harmful liquids. When combined with fabrics through dot lamination, it can provide wearers high protection, comfort, warmth and air permeability, etc., meeting multiple demands.

Example of Embodiment

The embodiments of the present disclosure will be described in detail below with reference to the accompanying drawings, however, the following examples are intended to illustrate this disclosure and are not intended to limit the scope of this disclosure. Those which do not specify the specific conditions in the examples are carried out according to the conventional conditions or the conditions recommended by the manufacturer. Those reagents or instruments used without indication of the manufacturer are conventional products that can be obtained commercially.

Preparation Example 1 Preparation of High Molecular Weight

Polytetrafluoroethylene Copolymerization Dispersion Resin

In a horizontal high-pressure reactor with about 1000 liters of chamber volume, first add 500 liters of deionized water, 20 kg of high-purity paraffin (melting point 50° C. 85° C.), and 180 g of ammonium perfluorooctanoate, vacuum the high-pressure reactor to vented the gas (until the oxygen content is <20 ppm), then raise temperature and start stirring; when the temperature in the high-pressure reactor is raised to about 70° C., tetrafluoroethylene gas having a purity of >99.999% is introduced into the high-pressure reactor to bring the pressure in the high-pressure reactor to about 22 kg. Then, 300 g of perfluoroethyl vinyl ether (C2F5–OCF=CF2) having a purity of >98% is used as a comonomer; start adding it to the high-pressure reactor at a rate of 10 g per minute while 0.8 g of ammonium persulfate (dissolved in advance in 500 ml of water) is added to the high-pressure reactor as an initiator. The copolymerization reaction is started. The temperature in the high-pressure reactor is maintained at 80 to 100° C., and tetrafluoroethylene gas is introduced during the reaction to maintain the pressure in the high-pressure reactor at about 20 kg. Continue to react until the solid content of the emulsion reaches about 30%. After the temperature in the high-pressure reactor is reduced to less than 50° C., the stirring is stopped, the unreacted monomer is discharged, the pressure is reduced, and the reactant is discharged to obtain an ultrahigh molecular weight polytetrafluoroethylene copolymer dispersion resin. The emulsion has an average particle size of about 280 nm. After the emulsion is diluted and stirred at a high speed, the emulsion is condensed and demulsified. The suspended polymer is placed in a tray and dried in a high temperature oven at 190° C. to obtain a high molecular weight polytetrafluoroethylene copolymer dispersion resin. After testing, the standard specific gravity of the tetrafluoroethylene copolymerized dispersion resin is about 2.149, and the melting point peak is between 325° C. and 350° C.

Preparation Example 2 Preparation of Urethane Acrylate Prepolymer

In a high-pressure reactor with about 200 liters of internal volume, the jacket is first heated to 100° C., and the kettle is vacuumed and dehumidified by nitrogen. 26.2 kg 4,4'-Methylene-bis-(cyclohexyl isocyanate) HMDI (containing about 200 moles of NCO isocyanate) is added. Stirring is started, the temperature in the high-pressure reactor is raised to about 100° C., and then 60 kg (containing about 60 mol-OH hydroxyl group) of polypropylene glycol (molecular weight of about 2000) is added to the kettle. After about 90 minutes, 18.2 kg hydroxyethyl methacrylate (containing about 140 moles of —OH hydroxyl group) is added, the temperature in the kettle is maintained at about 100° C. After about one hour of reaction, a urethane acrylate prepolymer having a viscous liquid is obtained. After cooling, it is a liquid at 50° C., indicating that the melting point is below 50° C.

Preparation Example 3 Preparation of a Mixture of Urethane Acrylate Prepolymer and Fluorine Free Alkyl Acrylate (3A) The weight ratio of urethane acrylate prepolymer and fluorine-free alkyl acrylate is 3:7; in a stirring tank with about 100 liters of internal volume, add 15 kg of the urethane acrylate prepolymer obtained in Example 2 under normal temperature and normal pressure, then add 35 kg of isodecyl acrylate (CAS: 1330-61-6), continuously stir to a homogeneous phase, stop stirring, and discharge the mixture to obtain a mixture of urethane acrylate prepolymer and fluorine-free alkyl acrylates.

(3B) The weight ratio of urethane acrylate prepolymer and fluorine-free alkyl acrylate is 5:5; in a stirring tank with about 100 liters of internal volume, add 25 kg of the urethane acrylate prepolymer obtained in Example 2 under normal temperature and normal pressure, then add 25 kg of isodecyl acrylate (CAS: 1330-61-6), continuously stir to a homogeneous phase, stop stirring, and discharge the mixture to obtain a mixture of urethane acrylate prepolymer and fluorine-free alkyl acrylates.

Embodiment Example, Fluorine-Containing Mixture, Fluorine-Containing Microporous Membrane and the Preparation of the Composite Fabric Thereof Embodiment Example 1

Use a gentle and shear-free method to mix the following components in a weight ratio percentage of (A:B:C:D)=(70: 10:19:1) for about half an hour to obtain a fluorine containing opaque white mixture, that is, the described fluorine-containing mixture: Component A is the high molecular weight polytetrafluoroethylene copolymerization dispersion resin obtained in Preparation Example 1; Component B is a mixture of two or more perfluoroalkylethyl acrylates (average molecular weight<1000, melting point less than 35° C.; the perfluoroalkyl group has a distribution of about C4: 10%, C6; 30%, C8; 50%, C10: 10%); Component C is a mixture of urethane acrylate prepolymer and the fluorine-free alkyl acrylates obtained in 3A of Preparation Example 3; Component D is high temperature free radical initiator cumene hydroperoxide (CAS: 80-15-9). The described fluorine-containing mixture has a standard specific gravity of about 1.89 g/cm$^3$.

Embodiment Example 2

Use a gentle and shear-free method to mix the following components in a weight ratio percentage of (A:B:C:D)=(80: 19:0:1) for about half an hour to obtain a special fluorine containing white mixture: Component A is the high molecular weight polytetrafluoroethylene copolymerization dispersion resin obtained in Preparation Example 1; Component B is a mixture of two or more perfluoroalkylethyl acrylates (average molecular weight<1000, melting point less than 35° C.; the perfluoroalkyl group has a distribution of about C4: 10%, C6; 60%, C8; 30%); Component D is high temperature free radical initiator cumene hydroperoxide (CAS: 80-15-9). The special fluorine-containing mixture has a standard specific gravity of about 2.03 g/cm$^3$.

Embodiment Example 3

Use a gentle and shear-free method to mix the following components in a weight ratio percentage of (A:B:C:D)=(65: 11:23:1) for about half an hour to obtain a fluorine containing opaque white mixture, that is, the described fluorine-containing mixture: Component A is the high molecular weight polytetrafluoroethylene copolymerization dispersion resin obtained in Preparation Example 1; Component B is a mixture of two or more perfluoroalkylethyl acrylates (average molecular weight<1000, melting point less than 35° C.; the perfluoroalkyl group has a distribution of about C4: 10%, C6; 30%, C8; 50%, C10: 10%); Component C is a mixture of urethane acrylate prepolymer and the fluorine-free alkyl acrylates obtained in 3B of Preparation Example 3; Component D is high temperature free radical initiator cumene hydroperoxide (CAS: 80-15-9). The described fluorine containing mixture has a standard specific gravity of about 1.85 g/cm$^3$.

Embodiment Example 4

Use a gentle and shear-free method to mix the following components in a weight ratio percentage of (A:B:C:D)=(78: 10:11:1) for about half an hour to obtain a special fluorine containing opaque white mixture, that is, the described fluorine-containing mixture: Component A is the high molecular weight polytetrafluoroethylene copolymerization dispersion resin obtained in Preparation Example 1; Component B is a mixture of two or more perfluoroalkylethyl acrylates (average molecular weight<1000, melting point less than 35° C.; the perfluoroalkyl group has a distribution of about C4: 10%, C6: 60%, C8: 30%); Component C is isodecyl acrylate (CAS: 1330-61-6); Component D is high temperature free radical initiator cumene hydroperoxide (CAS: 80-15-9). The special fluorine-containing mixture has a standard specific gravity of about 1.98 g/cm$^3$.

Embodiment Example 5

The fluorine-containing mixture obtained in Embodiment Example 1 is pre-compressed into a cylindrical paste mixture at 70° C. after shear-free stirring, and then the paste mixture is passed through a pusher at about 70° C. It is extruded into a rod shape and then rolled into strips having a thickness of about 0.45 mm and a width of about 180 mm. The strip is rapidly stretched by about 4-fold vertically at a temperature of about 130° C., and then rapidly stretched by about 12-fold horizontally in a high temperature condition of about 180° C., and finally heat set at a high temperature of about 370° C., for about 11 seconds, to obtain the fluorine-containing super-oleophobic microporous membrane.

Tests show the obtained special fluorine-containing microporous membrane has a thickness of about 0.036 mm, a width of about 1800 mm, a weight of about 15 g/m$^2$, a porosity of about 80 to 83%, a tensile strength of >20 MPa, and an air permeability by the 100 ml air transmission rate Gurley Test of about 10 to 13 seconds.

Laminate the fluorine-containing super oleophobic microporous membrane and nylon 6 woven fabric (96 g/m$^2$) with polyurethane adhesive dots. The composite fabric has initial water-resistance of more than 200 kPa; after ten washes, the water pressure resistance is still greater than 100 kPa; the oil resistance of the membrane surface is initially 7 grades, after washing 10 times, the oil resistance of the membrane surface is still 6 grades; the air permeability Gurley method 100 ml air permeation of the composite fabric is about 15-20 seconds; the sealing effect with seam sealing tape at the seam is good and meets the application requirements. All other performance indicators are in line with the standards of waterproof and air-permeable clothing fabrics. The test standards are shown in Table 1.

Embodiment Example 6

The fluorine-containing mixture obtained in Example 2 is uniformly pre-pressed into a cylindrical paste mixture at 70°

C. by shear-free stirring, and then the paste mixture is passed through a pusher at about 70° C. It is extruded into a rod shape and then rolled into strips having a thickness of about 0.45 mm and a width of about 180 mm. The strip is rapidly stretched about 4-fold vertically at a temperature of about 140° C., and then rapidly stretched about 12-fold horizontally in a high temperature condition of about 190° C., and finally heat set at a high temperature of about 370° C., for about 11 seconds, to obtain the fluorine-containing super-oleophobic microporous membrane.

Tests show the obtained fluorine-containing microporous membrane has a thickness of about 0.031 mm, a width of about 1800 mm, a weight of about 15 g/m$^2$, a porosity of about 86 to 89%, a tensile strength of >25 MPa, and an air permeability by the 100 ml air transmission rate Gurley Test of about 8 to 10 seconds.

Laminate the fluorine-containing super oleophobic microporous membrane and nylon 6 woven fabric (96 g/m$^2$) with polyurethane adhesive dots. The composite fabric has initial water-resistance of more than 200 kPa; after ten washes, the water pressure resistance is still greater than 150 kPa; the oil resistance of the membrane surface is initially 8 grades, after washing 10 times, the oil resistance of the membrane surface is still 7 grades; the air permeability Gurley method 100 ml air permeation of the composite fabric is about 13-17 seconds; the sealing effect with seam sealing tape at the seam is good and meets the application requirements. All other performance indicators are in line with the standards of waterproof and air-permeable clothing fabrics. The test standards are as mentioned above shown in Table 1.

Embodiment Example 7

The fluorine-containing mixture obtained in Embodiment Example 3 is uniformly pre-pressed into a cylindrical paste mixture at 70° C. by shear-free stirring, and then the paste mixture is passed through a pusher at about 70° C. It is extruded into a rod shape and then rolled into strips having a thickness of about 0.45 mm and a width of about 180 mm. The strip is rapidly stretched 4-fold vertically at a temperature of about 130° C., and then rapidly stretched 12-fold horizontally in a high temperature condition of about 190° C., and finally heat set at a high temperature of about 370° C., for about 11 seconds, to obtain the fluorine-containing super-oleophobic microporous membrane.

Tests show the obtained fluorine-containing microporous membrane has a thickness of about 0.039 mm, a width of about 1800 mm, a weight of about 16 g/m$^2$, a porosity of about 76 to 80%, and an air permeability by the 100 ml air transmission rate Gurley Test of about 13 to 16 seconds.

Laminate the fluorine-containing super oleophobic microporous membrane and nylon 6 woven fabric (96 g/m$^2$) with polyurethane adhesive dots. The composite fabric has initial water-resistance of more than 200 kPa; after ten washes, the water pressure resistance is still greater than 100 kPa; the oil resistance of the membrane surface is initially 7 grades, after washing 10 times, the oil resistance of the membrane surface is still 5 grades; the tensile strength of the membrane is >20 Mpa; the air permeability Gurley method 100 ml air permeation of the composite fabric is about 19-23 seconds; the sealing effect with seam sealing tape at the seam is good and meets the application requirements. All other performance indicators are in line with the standards of waterproof and air-permeable clothing fabrics. The test standards are shown below.

Embodiment Example 8

The fluorine-containing mixture obtained in Embodiment Example 4 is uniformly pre-pressed into a cylindrical paste mixture at 70° C. by shear-free stirring, and then the paste mixture is passed through a pusher at about 70° C. It is extruded into a rod shape and then rolled into strips having a thickness of about 0.45 mm and a width of about 180 mm. The strip is rapidly stretched 4-fold vertically at a temperature of about 140° C., and then rapidly stretched 12-fold horizontally in a high temperature condition of about 190° C., and finally heat set at a high temperature of about 370° C., for about 12 seconds, to obtain the fluorine-containing superoleophobic microporous membrane.

After testing, the obtained fluorine-containing microporous membrane has a thickness of about 0.032 mm, a width of about 1800 mm, a weight of about 15 g/m$^2$, a porosity of about 86 to 89%, a tensile strength of >20 MPa, and an air permeability by the 100 ml air transmission rate Gurley Test of about 6 to 8 seconds.

Laminate the fluorine-containing super oleophobic microporous membrane and nylon 6 woven fabric (96 g/m$^2$) with polyurethane adhesive dots. The composite fabric has initial water-resistance of more than 200 kPa; after ten washes, the water pressure resistance is still greater than 100 kPa; the oil resistance of the membrane surface is initially 7 grades, after washing 10 times, the oil resistance of the membrane surface is still 6 grades; the air permeability Gurley method 100 ml air permeation of the composite fabric is about 10-13 seconds; the sealing effect with seam sealing tape at the seam is good and meets the application requirements. All other performance indicators are in line with the standards of waterproof and air-permeable clothing fabrics. The test standards are as mentioned above shown in Table 1.

Embodiment Example 9

The fluorine-containing mixture obtained in Embodiment Example 2 is mixed with the isodecyl acrylate (component C) and activated carbon fine powder in a weight ratio of about 7:1:2 through non-shear mixing, and then pre-compressed into a cylinder at about 70° C. The paste mixture is further extruded into a rod shape by a pusher at about 70° C. and then calendered into a strip having a thickness of about 0.9 mm and a width of about 180 mm. The dry strip is rapidly stretched 8-fold vertically under high temperature conditions of about 140° C., and then rapidly stretched 12-fold horizontally at a high temperature of about 190° C., and finally heat set at a high temperature of about 370° C., for 16 seconds, to obtain a gray fluorine super-oleophobic microporous membrane. In the present embodiment, the purpose of adding component C is mainly to avoid the problem of high viscosity or uneven mixture from adding active carbon fine powder directly.

Tests show that the obtained fluorine-containing microporous membrane has a thickness of about 0.048 mm, a width of about 1800 mm, a weight of about 17 g/m$^2$, a porosity of about 77 to 81%, and an air permeability by the 100 ml air transmission rate Gurley Test of about 5 to 7 seconds.

Laminate the fluorine-containing super oleophobic microporous membrane and cotton-containing woven fabric (150 g/m$^2$) with polyurethane adhesive dots. The composite fabric has initial water-pressure-resistance of more than 100 kPa; after ten washes, the water pressure resistance is still greater than 100 kPa; the oil resistance of the membrane surface is initially grade 7, after 10 washes, the oil resistance of the membrane surface is still grade 6; the air permeability Gurley method 100 ml air permeation of the composite fabric is about 9-13 seconds; the sealing effect with seam sealing tape at the seam is good and meets the application requirements. The activated carbon containing fluorine containing super-oleophobic microporous membrane has the capability to resist the intrusion of toxic liquids and absorb toxic gases. All other performance indicators are in line with the standards of waterproof and air-permeable clothing fabrics. The test standards are as mentioned above shown in Table 1.

Embodiment Example 10

The fluorine-containing mixture obtained in the second embodiment of Embodiment Example 4 is mixed with isodecyl acrylate (component C) and graphite fine powder in a weight ratio of about 8:1:1 through non-shear mixing, and then pre-compressed into a cylindrical paste mixture at about 70° C.; the paste mixture was extruded into a rod shape by a pusher at about 70° C., and then rolled into a strip having a thickness of about 0.45 mm and a width of about 180 mm. The dry strip is rapidly stretched 4-fold vertically under high temperature conditions of about 140° C., and then rapidly stretched 12-fold horizontally at a high temperature of about 200° C., and finally heat set at a high temperature of about 370° C., for 13 seconds, to obtain a gray fluorine super-oleophobic microporous membrane. In the present embodiment, the purpose of adding component C is mainly to avoid the problem of high viscosity or uneven mixture from adding active carbon fine powder directly.

Tests show that the obtained fluorine-containing microporous membrane has a thickness of about 0.039 mm, a width of about 1800 mm, a weight of about 15 g/m$^2$, a porosity of about 81 to 86%, a tensile strength of >20 MPa, and an air permeability by the 100 ml air transmission rate Gurley Test of about 3 to 5 seconds.

Laminate the fluorine-containing superoleophobic microporous membrane and polyester woven fabric (70 g/m$^2$) with polyurethane adhesive dots. The composite fabric has initial water-resistance of more than 100 kPa; after ten washes, the water pressure resistance is still greater than 70 kPa; the oil resistance of the membrane surface is initially grade 7, after washing 10 times, the oil resistance of the membrane surface is still grade 5; the air permeability Gurley method 100 ml air permeation of the composite fabric is about 8-10 seconds; the sealing effect with seam sealing tape at the seam is good and meets the application requirements. The active-carbon containing fluorine-containing super-oleophobic microporous membrane has destaticizing capability. All other performance indicators are in line with the standards of industrial protective clothing fabrics. The test standards are as mentioned above shown in Table 1.

Comparative Example 1 (without Adding Special Polyblends)

A polytetrafluoroethylene dispersion resin powder (available from Daikin Corporation of Japan, Resin No. 106) having a standard specific gravity of about 2.156 and Mobil Advanced Lubricant (Isopar M) are mixed at a weight ratio of about 4:1. The paste mixture is pre-compressed into a cylindrical shape, extruded into a rod shape by a pusher at about 70° C., and then rolled into a strip having a thickness of about 0.60 mm and a width of about 180 mm. The strip is deoiled in an oven at about 230° C. to obtain a dry strip, which is stretched vertically about 6-fold at a high temperature of about 250° C., and then stretched about 12-fold horizontally at a high temperature of about 300° C., and finally heat set at a high temperature of about 370° C. for 18 seconds to obtain an expanded microporous fluorinated membrane.

Tests show that the obtained expanded microporous fluorinated membrane has a thickness of about 0.036 mm, a width of about 1800 mm, a weight of about 14 g/m$^2$, a porosity of about 80 to 85%, a tensile strength of >20 MPa, and an air permeability by the 100 ml air transmission rate Gurley Test of about 12 to 16 seconds.

Laminate the expanded microporous fluorinated membrane and nylon 6 woven fabric (96 g/m$^2$) with polyurethane adhesive dots. The composite fabric has initial water-resistance of more than 200 kPa; after ten washes, the water pressure resistance is less than 10 kPa; the oil resistance of the membrane surface is initially grade 1, after washing 10 times, the oil resistance of the membrane surface is grade 0 (not oil resistant at all); the air permeability Gurley method 100 ml air permeation of the composite fabric is about 17-22 seconds; the sealing effect with seam sealing tape at the seam is poor and does not meet the application requirements. Such membranes do not meet the standards for waterproof and air-permeable apparel fabrics. The test standards are listed below.

Comparative Example 2 (Compare to CN103158310A, Mixing Polyurethane, Without Fluorinated Alkyl Acrylate)

A polytetrafluoroethylene dispersion resin powder (available from Daikin Corporation of Japan, Resin No. 106) having a standard specific gravity of about 2.156, the mixture of urethane acrylate prepolymer and fluorine-free alkyl acrylate obtained from 3A of Embodiment Example 3, and high temperature free radical initiator di-tert-butyl peroxide (CAS: 110-05-4) are mixed together at a weight ratio of (A:B:C:D)=(66:0:33:1). After mixing uniformly, the paste mixture is pre-compressed into a cylindrical shape, extruded into a rod shape by a pusher at about 70° C., and then rolled into a strip having a thickness of about 0.45 mm and a width of about 180 mm. The dry strip is rapidly stretched 4-fold vertically under high temperature conditions of about 140° C., and then rapidly stretched 12-fold horizontally at a high temperature of about 190° C., and finally heat set at a high temperature of about 370° C., for 11 seconds, to obtain a fluorine-containing super-oleophobic microporous membrane.

The obtained fluorine-containing microporous film is tested to have a thickness of about 0.038 mm, a width of about 1800 mm, a film weight of about 13 g/m$^2$, a porosity of about 77 to 82%, a tensile strength of >20 MPa, and a air permeability, Gurley test, 100 ml air permeation rate, of 18 to 23 seconds.

Laminate the fluorine-containing microporous membrane and nylon 6 woven fabric (96 g/m$^2$) with polyurethane adhesive dots. The composite fabric has an initial water-resistance of less than 150 kPa; after ten washes, the water pressure resistance is less than 10 kPa; the oil resistance of the membrane surface is initially grade 0, after washing 10 times, the oil resistance of the membrane surface is grade 0 (not oil resistant at all); the air permeability Gurley method 100 ml air permeation of the composite fabric is about 12-17 seconds; the sealing effect with seam sealing tape at the seam is poor and does not meet the application requirements.

Such membranes do not meet the standards for waterproof and air-permeable apparel fabrics. The test standards are listed below.

Comparative Example 3 (Cf. CN102294181A Mixed with Polymer Fluorine-Containing Alkyl Acrylate, Number Average Molecular Weight>10000)

According to the method of the second embodiment of CN102294181A, a fluorine-containing microporous film (containing a flammable and explosive solvent, a polymer fluorine-containing alkyl acrylate, and a number average molecular weight of >10000) is prepared, and the thickness of the obtained fluorine-containing microporous film is determined to be 0.020 mm, with porosity of about 80-84%, film tensile strength<15 MPa, air permeability Gurley test 100 ml air transmission rate of about 12 to 18 seconds. Laminate the fluorine-containing microporous membrane and nylon 6 woven fabric (96 g/m$^2$) with polyurethane adhesive dots. The composite fabric has an initial water-resistance of less than 150 kPa; after ten washes, the water pressure resistance is less than 50 kPa; the oil resistance of the membrane surface is initially grade 3, after washing 10 times, the oil resistance of the membrane surface is grade 2 (poor oil resistance); the air permeability Gurley method 100 ml air permeation of the composite fabric is about 20-27 seconds; the sealing effect with seam sealing tape at the seam is poor and does not meet the application requirements. Such membranes do not meet the standards for waterproof and air-permeable apparel fabrics. The test standards are listed in Table 1 as mentioned above.

In summary, using the fluorine-containing mixture of the present disclosure as a raw material to prepare the fluorine-containing super-oleophobic microporous membrane will have no need for adding the flammable and explosive lubricating oil, can be directly pressed into a strip, uniaxially or biaxially stretched, and then heat set to obtain the fluorine-containing super-oleophobic microporous membrane with better protective function. The processing technology has high safety, does not have the three waste problems, and the membrane product has high water resistance, oil resistance, water washing resistance and stain resistance. The fluorine-containing microporous membrane can resist high water pressure and prevent toxic and harmful liquid from invading the human body. It has excellent air and moisture permeability, and has a good sealing effect at the seam, which can meet the requirements of the required application. When applied to protective clothing, it has high waterproof pressure resistance and protective function against toxic and harmful liquid penetration. It is light, comfortable, warm and air-permeable, which can greatly enhance the combat protection of the wearer.

The above-described embodiments of the present disclosure are merely illustrative of the present disclosure and are not intended to limit the embodiments of the present disclosure. Other variations or modifications of the various forms will be apparent to those skilled in the art from the above description. There is no need and no way to exhaust all the implementations. Any modifications, equivalent substitutions and improvements made within the spirit and scope of the disclosure are intended to be included within the scope of the appended claims.

The invention claimed is:

1. A fluorine-containing mixture for a fluorine-containing super-oleophobic microporous membrane, comprising the following compositions in weight percent:

Component A: about 50% to about 90%;
Component B: about 8.5% to about 16.4%;
Component C: 0% to about 35%; and
Component D: 0% to about 3%;
wherein:
Component A comprises high molecular weight polytetrafluoroethylene homopolymer or copolymer dispersion resin;
Component B comprises one or more fluorine-containing alkyl acrylate monomers selected from the group consisting of comprising perfluorobutyl ethyl acrylate, perfluorobutyl ethyl methacrylate, perfluorohexyl ethyl acrylate, perfluorooctylethyl acrylate, perfluorooctylethyl methacrylate, n-methyl perfluorobutyl sulfonate ethyl methacrylate, n-methyl perfluorohexyl sulfonate ethyl acrylate, n-methyl perfluorohexyl sulfonate ethyl methacrylate, n-methyl perfluorooctyl sulfonate ethyl acrylate, and n-methyl perfluorooctyl sulfonate ethyl methacrylate;
Component C comprises one or more fluorine-free acrylates; and
Component D comprises high temperature free radical initiator.

2. The fluorine-containing mixture for a fluorine-containing super-oleophobic microporous membrane according to claim 1, wherein Component A, Component B, Component C, and Component D are added in sequence to the mixture and obtained after mixing through non-shear mixing.

3. The fluorine-containing mixture for a fluorine-containing super-oleophobic microporous membrane according to claim 1, wherein the standard specific gravity of the Component A is 2.13 to 2.18.

4. The fluorine-containing mixture for a fluorine-containing super-oleophobic microporous membrane according to claim 1, wherein the Component B has a weight average molecular weight of <3000 and a melting point of 80° C. or less.

5. The fluorine-containing mixture for a fluorine-containing super-oleophobic microporous membrane according to claim 1, wherein the Component C has a weight average molecular weight of <8000 and a melting point of 80° C. or less.

6. The fluorine-containing mixture for a fluorine-containing super-oleophobic microporous membrane according to claim 1, wherein the high radical initiator include one or several kinds of dicumyl peroxide, 2,5-dimethyl-2,5-di-(tert-butylperoxy) hexane, di-tert-butyl peroxide, 2,5-di(tert-butylperoxy)-2,5-dimethyl-3-hexyne, and cumene hydroperoxide.

7. The fluorine-containing mixture for a fluorine-containing super-oleophobic microporous membrane according to claim 1, wherein the Component C comprises fluorine-free alkyl acrylate or a mixture of fluorine-free alkyl acrylate and polyurethane acrylate prepolymers.

8. A fluorine-containing super-oleophobic microporous membrane, wherein the fluorine-containing super-oleophobic microporous membrane is made from the fluorine-containing mixture according to claim 1.

9. The fluorine-containing super-oleophobic microporous membrane according to claim 8, wherein the raw material comprises one or more additive materials including active carbon powder, graphite, or inorganic compound and the fluorine-containing mixture, and wherein the weight ratio of the fluorine-containing mixture to the additives is 1:0.1 to 1.0.

10. The fluorine-containing super-oleophobic microporous membrane according to claim 9, wherein the one or more additive materials includes the inorganic compound, and wherein the inorganic compound is titanium dioxide or silicon dioxide.

11. A fluorine-containing mixture for a fluorine-containing super-oleophobic microporous membrane, comprising the following compositions in weight percent:
Component A: about 50% to about 90%;
Component B: about 9% to about 25%;
Component C: 0% to about 35%; and
Component D: 0% to about 3%;
wherein:
Component A comprises high molecular weight polytetrafluoroethylene homopolymer or copolymer dispersion resin;
Component B comprises one or more fluorine-containing alkyl acrylate monomers;
Component C comprises one or more fluorine-free acrylates; and
Component D comprises high temperature free radical initiator.

12. The fluorine-containing mixture for a fluorine-containing super-oleophobic microporous membrane according to claim 11, wherein Component A, Component B, Component C, and Component D are added in sequence to the mixture and obtained after mixing through non-shear mixing.

13. The fluorine-containing mixture for a fluorine-containing super-oleophobic microporous membrane according to claim 11, wherein the standard specific gravity of the Component A is 2.13 to 2.18.

14. The fluorine-containing mixture for a fluorine-containing super-oleophobic microporous membrane according to claim 11, wherein the Component B has a weight average molecular weight of <3000 and a melting point of 80° C. or less.

15. The fluorine-containing mixture for a fluorine-containing super-oleophobic microporous membrane according to claim 11, wherein the Component C has a weight average molecular weight of <8000 and a melting point of 80° C. or less.

16. The fluorine-containing mixture for a fluorine-containing super-oleophobic microporous membrane according to claim 11, wherein the high radical initiator include one or several kinds of dicumyl peroxide, 2,5-dimethyl-2,5-di-(tert-butylperoxy) hexane, di-tert-butyl peroxide, 2,5-di(tert-butylperoxy)-2,5-dimethyl-3-hexyne, and cumene hydroperoxide.

17. The fluorine-containing mixture for a fluorine-containing super-oleophobic microporous membrane according to claim 11, wherein the Component C comprises fluorine-free alkyl acrylate or a mixture of fluorine-free alkyl acrylate and polyurethane acrylate prepolymers.

18. A fluorine-containing super-oleophobic microporous membrane, wherein the fluorine-containing super-oleophobic microporous membrane is made from the fluorine-containing mixture according to claim 11.

19. The fluorine-containing super-oleophobic microporous membrane according to claim 18, wherein the raw material comprises one or more additive materials including active carbon powder, graphite, or inorganic compound and the fluorine-containing mixture, and wherein the weight ratio of the fluorine-containing mixture to the additives is 1:0.1 to 1.0.

20. The fluorine-containing super-oleophobic microporous membrane according to claim 19, wherein the one or more additive materials includes the inorganic compound, and wherein the inorganic compound is titanium dioxide or silicon dioxide.

* * * * *